(12) United States Patent
Fujita et al.

(10) Patent No.: US 8,004,783 B2
(45) Date of Patent: Aug. 23, 2011

(54) METHOD FOR TESTING MAGNETIC RECORDING MEDIUM AND METHOD FOR PRODUCING MAGNETIC RECORDING MEDIUM

(75) Inventors: Junichi Fujita, Chiba (JP); Satoshi Fujimoto, Ichihara (JP)

(73) Assignee: Showa Denko K.K., Tokyo (JP)

( * ) Notice: Subject to any disclaimer, the term of this patent is extended or adjusted under 35 U.S.C. 154(b) by 121 days.

(21) Appl. No.: 12/484,756

(22) Filed: Jun. 15, 2009

(65) Prior Publication Data
US 2009/0316288 A1 Dec. 24, 2009

(30) Foreign Application Priority Data
Jun. 20, 2008 (JP) ................................ P2008-162277

(51) Int. Cl.
*G11B 27/36* (2006.01)
(52) U.S. Cl. .......................................................... 360/31
(58) Field of Classification Search .................... 360/31, 360/73, 75, 77.06, 78.07, 78.11; 714/774
See application file for complete search history.

(56) References Cited

U.S. PATENT DOCUMENTS

| | | | | | |
|---|---|---|---|---|---|
| 5,654,842 | A | * | 8/1997 | Takeda et al. | 360/77.06 |
| 6,130,793 | A | | 10/2000 | Ohmori et al. | |
| 6,144,516 | A | * | 11/2000 | Takeda et al. | 360/75 |
| 6,683,744 | B2 | * | 1/2004 | Takano et al. | 360/78.11 |
| 6,954,318 | B2 | * | 10/2005 | Sato et al. | 360/31 |
| 6,957,379 | B1 | * | 10/2005 | Patapoutian et al. | 714/774 |
| 7,027,252 | B2 | * | 4/2006 | Cosci et al. | 360/75 |
| 7,342,741 | B1 | * | 3/2008 | Emo et al. | 360/78.07 |
| 7,457,065 | B2 | * | 11/2008 | Ogasawara et al. | 360/31 |
| 7,573,667 | B2 | * | 8/2009 | Kisaka | 360/53 |
| 7,672,073 | B2 | * | 3/2010 | Shrinkle et al. | 360/31 |
| 7,768,737 | B2 | * | 8/2010 | Sakurai et al. | 360/75 |
| 2005/0248868 | A1 | * | 11/2005 | Perez | 360/31 |
| 2007/0188907 | A1 | * | 8/2007 | Satoh et al. | 360/75 |
| 2007/0217049 | A1 | * | 9/2007 | Kida et al. | 360/31 |
| 2008/0204913 | A1 | * | 8/2008 | Umezaki et al. | 360/31 |
| 2009/0251816 | A1 | * | 10/2009 | Kikuchi | 360/31 |

FOREIGN PATENT DOCUMENTS

| | | |
|---|---|---|
| JP | 10-105908 A | 4/1998 |
| JP | 2003-257016 A | 9/2003 |

* cited by examiner

*Primary Examiner* — Fred Tzeng
(74) *Attorney, Agent, or Firm* — Sughrue Mion, PLLC

(57) ABSTRACT

A method for testing a magnetic recording medium includes positioning second magnetic heads in an inspected region of a testing subject medium based on servo information signals. A signal generating step generates a magnetic recording/reproducing signal by making the second magnetic heads to conduct a magnetic recording/reproducing process of the inspected region. A signal processing step inspects the magnetic recording/reproducing signal. A master medium includes a servo information region where servo information is recorded radially from the center in a continuous manner. The inspected region corresponds to regions in the master medium including two or more data information regions adjacent to each other in the same track position via the servo information region. The position of one of the inspected regions in the radial direction is arranged at a different position from that of another of the adjacent inspected regions arranged at a different track position.

11 Claims, 6 Drawing Sheets

(a)

(b)

METHOD FOR TESTING MAGNETIC RECORDING MEDIUM AND METHOD FOR PRODUCING MAGNETIC RECORDING MEDIUM

BACKGROUND OF THE INVENTION

1. Field of the Invention

The present invention relates to a testing method that can be suitably used for defect test or bit error rate test of a magnetic recording media used in a hard disk drive or the like and for certification tests such as a parametric (electromagnetic conversion characteristics) test.

Priority is claimed on Japanese Patent Application No. 2008-162277, filed Jun. 20, 2008, the content of which is incorporated herein by reference.

2. Description of the Related Art

Magnetic recording devices represented by a hard disk drive are widely used as an external storage device for an information processing apparatus such as a computer, and have also been used as a picture recording apparatus or the like for recording dynamic images in recent years.

A hard disk drive usually includes: a shaft causing a disc shaped (donut shaped) magnetic recording medium having an opening at the center to rotate as a single disc or to rotate as a plurality of stacked discs coaxially (when a plurality of discs are rotated, the discs are synchronously rotated); a motor coupled to the shaft through a bearing and rotates the magnetic recording medium; a magnetic head used for recording on/reproducing from both sides of the magnetic recording medium; a plurality of support arms to which the magnetic head is installed; and a head stack assembly that moves the plurality of support arms synchronously and delivers the magnetic head to any position on the magnetic recording medium. In addition, a magnetic head for magnetic recording/reproducing processes is usually a floating head and moves over a magnetic recording medium at a certain flying height.

In general, in a magnetic recording medium mounted in a hard disk drive, recording regions known as tracks and sectors are formed in the radial direction and in the track extending direction, respectively. Reading/writing of information in a magnetic recording medium is usually conducted on a unit track basis and on a unit sector basis.

In addition, hard disk drives have conventionally used servo information signals when positioning a magnetic head onto targeted tracks and sectors. The servo information signals are attained by making a magnetic head to read the servo information which has been recorded in a magnetic recording medium in advance. Servo information provides positional information of the recording region in a magnetic recording medium, and thus the current position of the recording region where the magnetic head is positioned can be detected by making the magnetic head read the servo information. Servo information is usually written on a magnetic recording medium radially and in a continuous manner in the radial direction.

In general, a magnetic recording medium is produced by the following steps. That is, a magnetic recording medium is formed by first subjecting the surface of a substrate made of an aluminum alloy, a glass substrate or the like to a texturing treatment or the like, followed by the sequential formation thereon of a base layer, a magnetic layer, a protective layer, a lubricating layer, and the like. Then a glide test and a certification test are carried out on the obtained magnetic recording medium in succession.

A glide test is a test to inspect the surface of a magnetic recording medium for the presence of projections and protrusions. That is, if there is a projection or a protrusion on the surface of a magnetic recording medium which is higher than the flying height (that is, the interval between the medium and a magnetic head) when recording on/reproducing from the magnetic recording medium using the magnetic head, the magnetic head will hit the projection and the protrusion, which may damage the magnetic head or may cause defects in the magnetic recording medium. In a glide test, the presence and absence of projections and protrusions with such heights are inspected (for example, refer to Patent Document 1).

A certification test is conducted on the magnetic recording medium that passed the glide test. The certification test is carried out so that, as in the usual recording/reproducing processes of a hard disk drive, following recording of predetermined signals on a magnetic recording medium using a magnetic head, the signals are reproduced and the recording failure of the magnetic recording medium is detected from the obtained reproduced signals, thereby verifying the quality of the magnetic recording medium in terms of the electrical characteristics, the presence and absence of defects, and the like (for example, refer to Patent Document 2). Accordingly, in the certification test, capability of the magnetic head in recording/reproducing predetermined signals is verified in a similar manner to that performed for the recording/reproducing processes of the hard disk drives. For this reason, as in an actual use method in the hard disk drives, it is preferable to write servo information in a magnetic recording medium using an apparatus known as a servo writer and to perform a test for detecting recording failure of the magnetic recording medium before the certification test.

[Patent Document 1] Japanese Unexamined Patent Application, First Publication No. Hei 10-105908

[Patent Document 2] Japanese Unexamined Patent Application, First Publication No. 2003-257016

However, in order to write the servo information in a magnetic recording medium, it generally takes from about 30 minutes to 2 hours to write in a one disc medium, although it depends on the size of the magnetic recording medium [and/or TPI (Track per Inch)] or [Number of Track per media surface]. Accordingly, writing of the servo information in a magnetic recording medium prior to the certification test may cause a decline in the productivity of magnetic recording medium. Moreover, due to the increasing demands for magnetic recording media in recent years, an testing apparatus for the certification test which is capable of testing numerous magnetic recording media within an even shorter time period has been required.

In the meantime, the recording density of magnetic recording media has been becoming larger and larger in recent years, and it has been required to carry out a certification test on a magnetic recording medium in a hard disk drive with a high degree of accuracy by employing an testing method, which is even closer to the actual method in which the medium is used.

SUMMARY OF THE INVENTION

The present invention is made in view of the above circumstances and its object is to provide a method for testing a magnetic recording medium that is close to the actual method through which the magnetic recording medium is used in a hard disk drive and which is capable of carrying out a certification test with a high degree of accuracy within a short period of time.

As a result of intensive and extensive studies in order to solve the above problems, the present inventors discovered the following. That is, while synchronously and coaxially rotating a disc shaped master medium in which servo information is recorded and a disc shaped medium to be tested (hereinafter referred to as a testing subject medium), by first synchronously moving a first magnetic head that reads the servo information from the master medium and a second magnetic head that conducts a magnetic recording/reproducing of the testing subject medium with respect to the surfaces of the master medium and the testing subject medium, and then testing the magnetic recording/reproducing signals in the testing subject medium using the servo information signals from the master medium and the magnetic recording/reproducing signals from the testing subject medium, a certification test with a high degree of accuracy that is close to the actual method through which the magnetic recording medium is used in a hard disk drive can be achieved without writing the servo information in the testing subject medium.

However, when conducting a certification test on a magnetic recording medium using this method, it is not possible to test an testing subject medium while the servo information signals are read from a master medium using the first magnetic head and the second magnetic head is positioned based on the obtained servo information signals. For this reason, a region in the testing subject medium which corresponds to the position where the servo information of the master medium is recorded will become an uninspected region. Accordingly, when conducting a certification test on a magnetic recording medium using this method, it has been impossible at times to achieve a sufficient testing accuracy since defects may not be detected even when magnetic defects are present in the uninspected region in the testing subject medium. In particular, when using a medium in which servo information is recorded radially and in a continuous manner from the center as a master medium, defects with a large size have remained undetected in some cases causing various problems.

A region to be inspected within an testing subject medium (hereinafter referred to as an inspected region) will be described herein using the attached drawings, when using, as a master medium, a medium having servo information regions in which servo information is provided radially and in a continuous manner from the center and in which regions between the adjacent servo information regions are made to become data information regions.

FIG. 6 is an enlarged plan view showing a portion of a disc shaped testing subject medium which has been enlarged. Note that in FIG. 6, the horizontal direction corresponds to the track extending direction in an testing subject medium 40 whereas the vertical direction corresponds to the radial direction of the testing subject medium 40. In addition, in FIG. 6, the reference symbols T1, T2, T3, T4, T5, and T6 refer to tracks, 4c shows a servo corresponding region in the testing subject medium 40 that corresponds to the servo information region in the master medium, and 4d shows a data corresponding region in the testing subject medium 40 that corresponds to the data information region in the master medium.

As shown in FIG. 6, the testing subject medium 40 includes a plurality of inspected regions 4e which will be inspected (regions shown with diagonal lines in FIG. 6) and a plurality of uninspected regions 4f which will not be inspected. Individual inspected region 4e corresponds to a range that is magnetically recorded/reproduced through one single process by the magnetic head which has been positioned in a positioning step, and is partitioned on a track to track basis in the track extending direction while being partitioned by uninspected regions 4f in the radial direction so as to form each one of the data corresponding regions. In addition, as shown in FIG. 6, the position of the inspected regions 4e in the radial direction is identical in all the tracks T1, T2, T3, T4, T5, and T6. Moreover, the uninspected regions 4f become a unified wide region inside the servo corresponding region 4c.

As shown in FIG. 6, when using a medium in which servo information is recorded radially from the center in a continuous manner as a master medium, a wide region made by the unification of the uninspected regions 4f will be formed since the uninspected regions 4f will be formed radially from the center of the testing subject medium 40 in a continuous manner. The wide region made of the uninspected regions 4f has a width that corresponds to the servo information region of the master medium in the track extending direction (in other words, a width in the track extending direction in the servo corresponding region 4c), and also has a width, in the radial direction, that extends over more than one track and is sufficiently wider than that in the track extending direction. When such a wide region made of the uninspected regions 4f is formed, there have been cases where large defects, which are as large as the wide region made of the uninspected regions 4f, for example, a large circular defect having a diameter as large as the width in the track extending direction in the servo information region of the master medium (in other words, a width in the track extending direction in the servo corresponding region 4c) have not been detected.

As a result of intensive and extensive studies in order to solve the above problems, the present inventors completed the present invention by adopting a configuration, in which a wide region formed of a plurality of uninspected regions 4f arranged radially from the center is made discontinuous so that large defects are made effectively detectable.

That is, the present invention relates to the following.

(1) A first aspect of the present invention is a method for testing a magnetic recording medium, the method characterized by including: a positioning step in which, while synchronously and coaxially rotating a disc shaped master medium where servo information is recorded and a disc shaped testing subject medium, by first synchronously moving, with respect to the surfaces of the master medium and the testing subject medium, a first magnetic head that reads the servo information from the master medium and a second magnetic head that carries out the magnetic recording/reproducing of the testing subject medium, and then the second magnetic head is positioned in an inspected region of the testing subject medium based on the servo information signal obtained by making the first magnetic head read the servo information from the master medium; a signal generating step in which a magnetic recording/reproducing signal is generated by making the second magnetic head conduct a magnetic recording/reproducing process of the inspected region; and a signal processing step in which the magnetic recording/reproducing signal obtained in the signal generating step is inspected; and the method is further characterized in that the master medium includes a servo information region where the servo information is recorded radially from the center in a continuous manner; the inspected region corresponds to regions in the master medium including 2 or more data information regions adjacent to each other in the same track position via the servo information region; and the position of one of the inspected regions in the radial direction is arranged at a different position from that of another of the adjacent inspected regions arranged at a different track position.

(2) A second aspect of the present invention is the method for testing a magnetic recording medium according to the first aspect characterized in that the inspected region corresponds to a region that includes 2 data information regions.

(3) A third aspect of the present invention is the method for testing a magnetic recording medium according to the first aspect or the second aspect characterized in that servo information signal from the first magnetic head and the magnetic recording/reproducing signal from the second magnetic head that corresponds to this servo information signal are processed alternately.

(4) A fourth aspect of the present invention is the method for testing a magnetic recording medium according to any one of the first to the third aspects characterized in that the testing subject medium is a plurality of media; in the positioning step, while the master medium and the plurality of the testing subject media are synchronously and coaxially rotated, by synchronously and coaxially rotating a first support arm at an end of which the first magnetic head is installed and a plurality of second support arms at an end of which the second magnetic head is installed, the first magnetic head and a plurality of second magnetic heads, each of which are installed in the plurality of second support arms, are moved synchronously; and in the signal generating step, the plurality of second magnetic heads are made to carry out a magnetic recording/reproducing process in each of the inspected regions of the plurality of inspected subject media, thereby generating each magnetic recording/reproducing signal.

(5) A fifth aspect of the present invention is a method for producing a magnetic recording medium characterized by including a testing step in which a testing process is carried out using the method for testing a magnetic recording medium of any one of the first to the fourth aspects.

According to the method of the present invention for testing a magnetic recording medium, since a master medium is provided with a servo information region in which servo information is recorded radially from the center in a continuous manner, the inspected region corresponds to regions in the master medium including 2 or more data information regions adjacent to each other in the same track position via the servo information region, and the position of one of the inspected regions in the radial direction is arranged at a different position from that of another of the adjacent inspected regions arranged at a different track position, a portion of the region that corresponds to the servo information region in the testing subject medium will be included in the inspected region, and thus defects in the region that corresponds to the servo information region in the testing subject medium can be detected and the accuracy for testing an testing subject medium can be improved.

In addition, according to the method of the present invention for testing a magnetic recording medium, since the method includes: a positioning step in which, while synchronously and coaxially rotating a disc shaped master medium where servo information is recorded and a disc shaped testing subject medium, by first synchronously moving, with respect to the surfaces of the master medium and the testing subject medium, a first magnetic head that reads the servo information from the master medium and a second magnetic head that carries out the magnetic recording/reproducing of the testing subject medium, and then the second magnetic head is positioned in the inspected region of the testing subject medium based on the obtained servo information signals by making the first magnetic head to read the servo information from the master medium; a signal generating step in which a magnetic recording/reproducing signal is generated by making the second magnetic head conduct a magnetic recording/reproducing process of the inspected region; and a signal processing step in which the magnetic recording/reproducing signal obtained in the signal generating step is inspected, a certification test with a high degree of accuracy can be conducted that is close to the actual method through which the magnetic recording medium is used in a hard disk drive. Moreover, according to the method of the present invention for testing a magnetic recording medium, since a certification test can be conducted without writing servo information in an testing subject medium, the test can be carried out within a short period of time as compared to the case where servo information is written in an testing subject medium, and thus the productivity of magnetic recording media can be highly improved. Furthermore, in the method of the present invention for testing a magnetic recording medium, a head stack assembly that is used in a hard disk drive can be used directly as it is.

Also, since the method for producing a magnetic recording medium according to the present invention includes a step for carrying out an testing process using the method of the present invention for testing a magnetic recording medium, which is excellent in terms of reliability and which has been inspected with a high level of testing accuracy, can be produced.

DESCRIPTION OF THE REFERENCE SYMBOLS

1: Nonmagnetic substrate; 2: Nonmagnetic base layer; 3: Magnetic layer; 4: Protective layer; 4c, 22c: Servo corresponding region; 4d, 22d: Data corresponding region; 4e, 22e: Inspected region; 4f, 22f: Uninspected region; 5: Liquid lubricating layer; 21: Master medium; 21a: Servo information region; 21b: Data information region; 22, 22a, 22b, 40: Testing subject medium; 23: Rotating mechanism; 25, 25a, 25b, 25c, 25d: Second magnetic head; 26: Flexible printed circuit board; 27: Signal processing circuit; 28: Head driving device; 29: Save area; 31: Head stack assembly; 32: First support arm; 33, 33a, 33b, 33c, 33d: Second support arm; 35: First magnetic head; 36: Pivot; 37: Coil; T, T1, T2, T3, T4, T5, T6: Track; S: Sector

DETAILED DESCRIPTION OF THE INVENTION

The present invention will be described in detail below.

Figure 1:
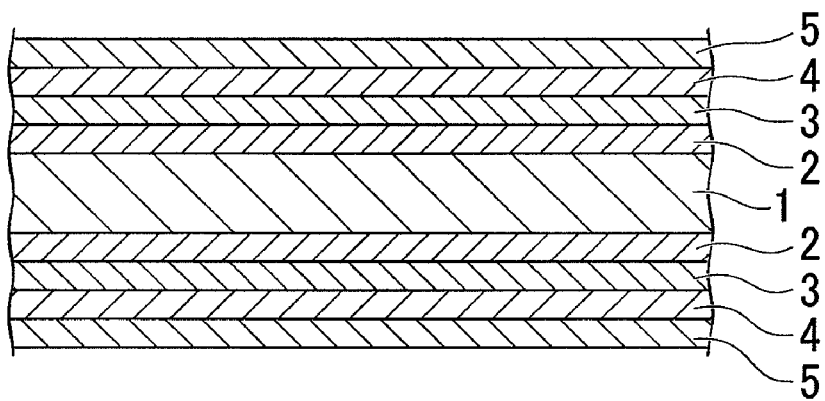
FIG. 1 is a cross sectional view showing one example of a magnetic recording medium which is subjected to a certification test using a method of the present invention for testing a magnetic recording medium.

FIG. 1 is a cross sectional view showing one example of a magnetic recording medium which is subjected to a certification test using a method of the present invention for testing a magnetic recording medium. A magnetic recording medium shown in FIG. 1 is a disc shaped medium formed by sequentially laminating a nonmagnetic base layer 2, a magnetic layer 3, a protective layer 4, and a liquid lubricating layer 5 on both upper and lower sides of a nonmagnetic substrate 1. As a magnetic recording medium inspected in the present invention, in addition to the both sided type media shown in FIG. 1, a one sided type medium may be used which is formed by sequentially laminating a nonmagnetic base layer, a magnetic layer, a protective layer, and a liquid lubricating layer only on one side of a nonmagnetic substrate.

Before conducting a certification test on the magnetic recording medium shown in FIG. 1, it is preferable to carry out a glide test as shown below. In the glide test, a testing head is lifted above a rotating magnetic recording medium, and by scanning the surface of the magnetic recording medium with the testing head, the presence of projections and protrusions on the surface of the magnetic recording medium is examined by the signals from the testing head. By carrying out a step for the glide test before the certification test, breakage of the testing head during the certification test can be prevented.

As a testing head which can be used in the glide test, a head having a thermal element can be exemplified. When a head having a thermal element is used, if the testing head is brought into contact with the projection present on a magnetic recording medium that is rotating at a high speed, heat is generated instantaneously in the testing head, and the glide test can be conducted through the detection of the generated heat as well as the signal output by the thermal element. Note that it is preferable to conduct a glide test while making the flying height of the testing head lower than that of a magnetic reading/writing head usually used in a hard disk drive.

Figure 2:
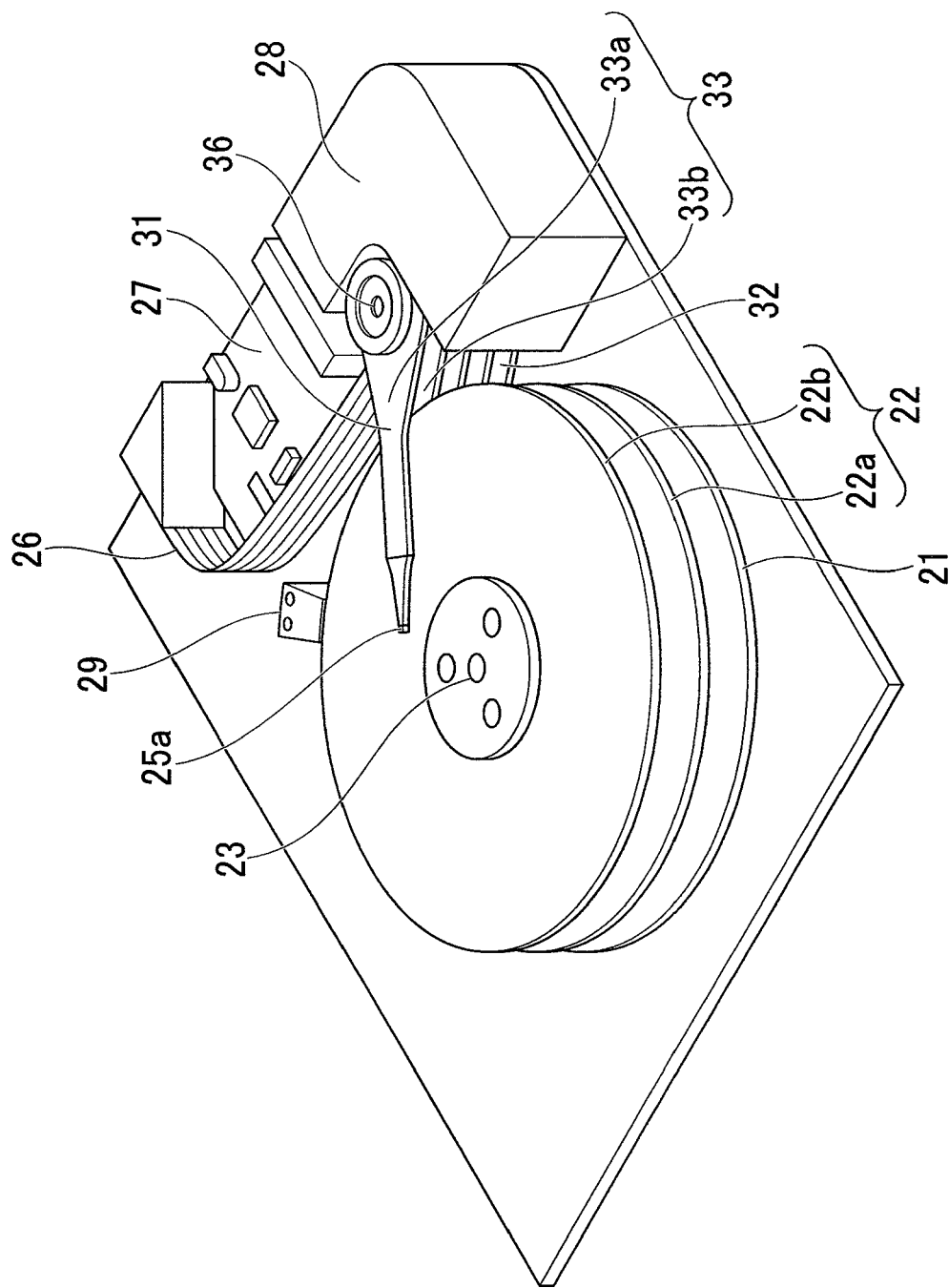
FIG. 2 is a perspective view showing one example of an testing apparatus for the certification test used in the method for subjecting a magnetic recording medium to a certification test according to the present invention.
Figure 3:
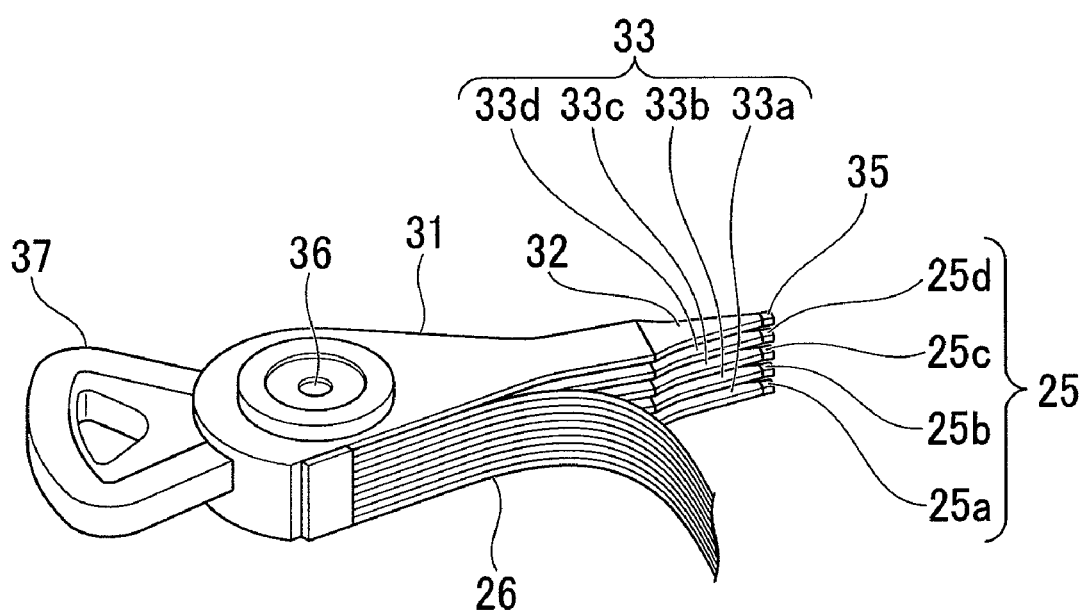
FIG. 3 is a perspective view of a head stack assembly provided in the testing apparatus for the certification test shown in FIG. 2 which is seen from the first support arm side.

Next, a method for conducting a certification test on a magnetic recording medium will be described using FIGS. 2 to 5. FIG. 2 is a perspective view showing one example of a testing apparatus for the certification test used in the method for subjecting a magnetic recording medium to a certification test according to the present invention. In addition, FIG. 3 is a perspective view of a head stack assembly 31 provided in the testing apparatus for the certification test shown in FIG. 2 which is seen from the first support arm 32 side. In the present embodiment, an example where a certification test is conducted on two testing subject media, each of which is a magnetic recording medium shown in FIG. 1, will be used for the explanation.

In FIG. 2, the reference numerals 21 and 22 indicate a master medium and a testing subject medium, respectively. In the present embodiment, as the testing subject medium 22, two testing subject media 22a and 22b are mounted. The master medium 21 as well as the testing subject media 22a and 22b have a disc shape and formed of a magnetic recording medium shown in FIG. 1. The master medium 21 and the testing subject media 22a and 22b are mounted at positions that overlap in plan view so as to be rotated synchronously and coaxially by a rotating mechanism 23 having a spindle motor as shown in FIG. 2.

Figure 4:
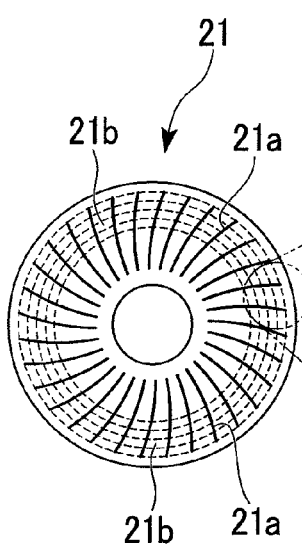
FIG. 4 is a diagram for explaining a master medium used in the present embodiment and FIG. 4, part (a) is a plan view showing the entire medium whereas FIG. 4, part (b) is an enlarged plan view showing a portion of FIG. 4, part (a) which has been enlarged.
Figure 4:
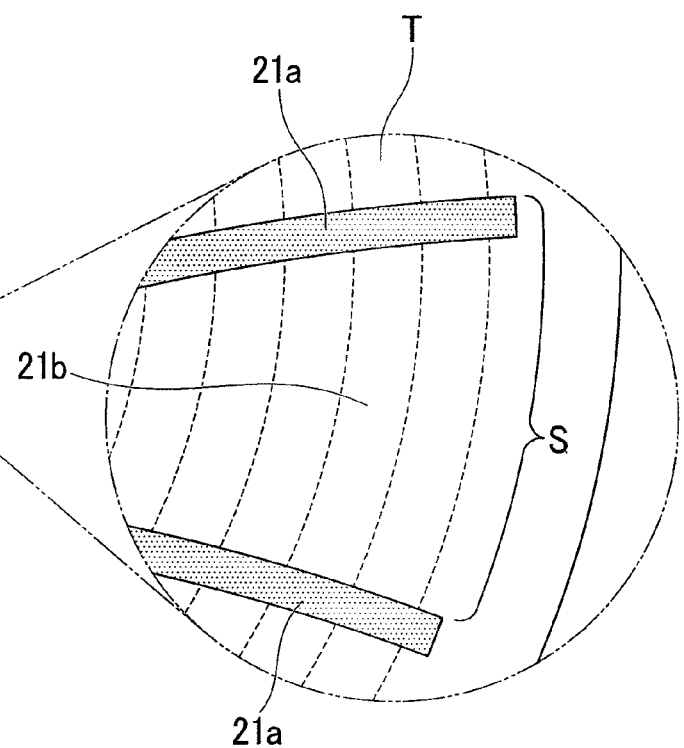

FIG. 4 is a diagram for explaining a master medium used in the present embodiment and FIG. 4, part (a) is a plan view showing the entire medium whereas FIG. 4, part (b) is an enlarged plan view showing a portion of FIG. 4, part (a) which has been enlarged. In FIG. 4, the reference numerals T and S indicate a track and a sector, respectively. As shown in FIG. 4, a plurality of servo information regions 21a are provided in the master medium 21 radially and in a continuous manner from the center, thereby forming data information regions 21b, each of which is formed between two adjacent servo information regions 21a. The servo information regions 21a are formed by recording servo information composed of track position information and sector position information in the recording region that corresponds to the respective positions.

As shown in FIG. 2, the master medium 21 is mounted at the lowest position on a spindle that rotates the master medium 21 as well as the testing subject media 22a and 22b, and the two testing subject media 22a and 22b are coaxially mounted above the master medium 21. By mounting the master medium 21 as well as the testing subject media 22a and 22b in the abovementioned manner, after the completion of a certification test conducted on the testing subject media 22a and 22b, the testing subject media 22a and 22b, which have already been inspected, can be replaced by an testing subject medium, which will be subjected to a certification test next, without dismounting the master medium 21 from the apparatus for the certification test.

In addition, in FIG. 2, the reference numerals 31, 32, and 33 indicate a head stack assembly, a first support arm, and a second support arm, respectively.

The first support arm 32 is provided with a first magnetic head 35 installed at the end thereof which reads servo information from the master medium 21 as shown in FIG. 3. In addition, the second support arm 33 is provided with a second magnetic head 25 installed at the end thereof which is mounted at a position above the first support arm 32 (below the first support arm 32 in FIG. 2) that overlaps with the first support arm 32 in plan view and conducts a magnetic recording/reproducing process on the testing subject medium 22. In the present embodiment, the second support arm 33 is mounted in 4 sets (namely, 33a, 33b, 33c, and 33d). As shown in FIG. 2, the second support arm 33a is configured so as to be movable over the front surface of the testing subject medium 22b and the second support arm 33b is configured so as to be movable over the back surface of the testing subject medium 22b. In addition, the second support arm 33c is configured so as to be movable over the front surface of the testing subject medium 22a and the second support arm 33d is configured so as to be movable over the back surface of the testing subject medium 22a. Further, it is configured so that a magnetic recording/reproducing process can be conducted individually on up to two of the inspected subject media 22 (2 discs in the present embodiment) by the second magnetic heads 25a, 25b, 25c, and 25d, each of which is installed at the respective ends of the 4 second support arms 33.

For the first magnetic head 35 and the 4 second magnetic heads 25a, 25b, 25c, and 25d, it is possible to use a head suited for achieving high recording density as a reproducing element which has not only a magnetoresistance (MR) element that uses a giant magnetoresistive effect but also a TuMR element and the like that use a tunnel magnetoresistive effect. By adopting a TuMR element among the abovementioned elements, a certification test with a high arial density test can be conducted.

In addition, in the head stack assembly 31 shown in FIG. 3, the first support arms 32 and 4 of the second support arms 33a, 33b, 33c, and 33d are packed into a bundle by one pivot 36 so that the first support arms 32 and 4 of the second support arms 33a, 33b, 33c, and 33d are rotated coaxially while the pivot 36 serves as the center of rotation. The rotation of the head stack assembly 31 having the pivot 36 as the center of rotation is conducted by a coil 37. The coil 37 is driven by an electric current that is controlled through a signal processing circuit 27 shown in FIG. 2.

In addition, in the head stack assembly 31 shown in FIG. 3, since it is configured so that the first support arm 32 and 4 the second support arms 33a, 33b, 33c, and 33d are rotated synchronously and coaxially, the first magnetic head 35 and 4 of the second magnetic heads 25a, 25b, 25c, and 25d are configured so as to move synchronously. As a result, in the present embodiment, the movement of the first magnetic head on the front surface of the master medium 21 shown in FIG. 2, the movement of the second magnetic head 25a on the front surface of the testing subject medium 22b shown in FIG. 2, the movement of the second magnetic head 25b on the back surface of the testing subject medium 22b, the movement of the second magnetic head 25c on the front surface of the testing subject medium 22a, and the movement of the second magnetic head 25d on the back surface of the testing subject medium 22a are all conducted synchronously.

In addition, the signal processing circuit 27 shown in FIG. 2 inspects the magnetic recording/reproducing signals in the testing subject medium 22 by synchronizing the servo information signals with the magnetic recording/reproducing signals.

The servo information signals are obtained by making the first magnetic head 35, through the first head driving signals from the signal processing circuit 27, to read servo information from the master medium 21. In addition, in the present embodiment, the magnetic recording/reproducing signals are generated by making the second magnetic heads 25a, 25b, 25c, and 25d, through the second head driving signals from the signal processing circuit 27, to conduct magnetic recording/reproducing processes on the recording regions that correspond to the servo information signals of the testing subject media 22a and 22b. It is preferable that the signal processing circuit 27 processes the servo information signals and the magnetic recording/reproducing signals alternately.

In addition, in the signal processing circuit 27, the first magnetic head 35 and the second magnetic heads 25 are electrically connected by a flexible printed circuit board 26 so that the servo information signals from the first magnetic head 35, the magnetic recording/reproducing signals from the second magnetic heads 25, the first head write signals from the signal processing circuit 27, the second head write signals from the signal processing circuit 27, and the like are transmittable/receivable. As a result, it is configured so that the first magnetic head 35 and 4 of the second magnetic heads 25a, 25b, 25c, and 25d are driven and controlled individually by the signals from the signal processing circuit 27.

In addition, the signal processing circuit 27 is electrically connected with a head driving device 28 that rotates the first support arm 32 and the second support arm 33, and the rotation of the first support arm 32 and the second support arm 33 having the pivot 36 as the center of rotation is controlled by making the signal processing circuit 27 to control the coil 37.

Accordingly, in the head stack assembly 31 according to the present embodiment, it is configured so that, by making the signal processing circuit 27 to control the coil 37, the first magnetic head 35, and 4 of the second magnetic heads 25 and thereby rotating the first support arm 32 and 4 of the second support arms 33, the first magnetic head 35 and 4 of the second magnetic heads 25 are moved synchronously, and the positions of the second magnetic heads 25a, 25b, 25c, and 25d with respect to the testing subject media 22a and 22b are determined based on the servo information signals.

In addition, in the testing apparatus for the certification test shown in FIG. 2, a save area 29 is provided for retracting the first magnetic head 35 and the second magnetic heads 25 that constitute the head stack assembly 31 when replacing the testing subject media 22a and 22b. As a result, by moving the first magnetic head 35 and the second magnetic heads 25 to the save area 29 when replacing the testing subject media 22a and 22b, it is possible to prevent the first support arm 32 and the second support arms 33 that constitute the head stack assembly 31 from interfering with the replacement of testing subject media.

When carrying out a certification test on two of testing subject media by the use of the testing apparatus for the certification test shown in FIG. 2 for magnetic recording media, the master medium 21 is first mounted at the lowest end of the spindle and 2 discs of the testing subject media 22a and 22b are mounted above the master medium 21. Subsequently, while synchronously and coaxially rotating the master medium 21 and the testing subject media 22a and 22b at the same rate by the rotating mechanisms 23, the first magnetic head 35 and the second magnetic heads 25a, 25b, 25c, and 25d are moved synchronously with respect to the surfaces of the master medium 21 and the testing subject media 22a and 22b.

Here, the first magnetic head 35 and the second magnetic heads 25a, 25b, 25c, and 25d are moved synchronously and coaxially, due to the synchronous rotation of the first support arm 32, to which the first magnetic head is installed at the end, and a plurality of second support arms 33a, 33b, 33c, and 33d, to which each of the second magnetic heads 25a, 25b, 25c, and 25d is installed at the end, respectively.

Then, based on the servo information signals obtained by making the first magnetic head 35, through the first head driving signals from the signal processing circuit 27, to read servo information from the master medium 21, the second magnetic heads 25a, 25b, 25c, and 25d are positioned in the inspected region of the testing subject media 22a and 22b (positioning step).

By conducting such a positioning step as described above, the first magnetic head 35 is lifted above the front surface of the master medium 21, the second magnetic head 25a is lifted above the front surface of the testing subject medium 22b, the second magnetic head 25b is lifted above the back surface of the testing subject medium 22b, the second magnetic head 25c is lifted above the front surface of the testing subject medium 22a, and the second magnetic head 25d is lifted above the back surface of the testing subject medium 22a, respectively.

The inspected regions of the testing subject media 22a and 22b where the second magnetic heads 25 are positioned will be described here by the use of the attached drawings. Note that since the testing subject media 22a and 22b are identical and all the front surfaces and back surfaces of the testing subject media 22a and 22b are identical, only the case for the front surface of the testing subject medium 22a will be described here and descriptions on the cases for the front and back surfaces of the testing subject medium 22b and the back surface of the testing subject medium 22a will be omitted.

Figure 5:
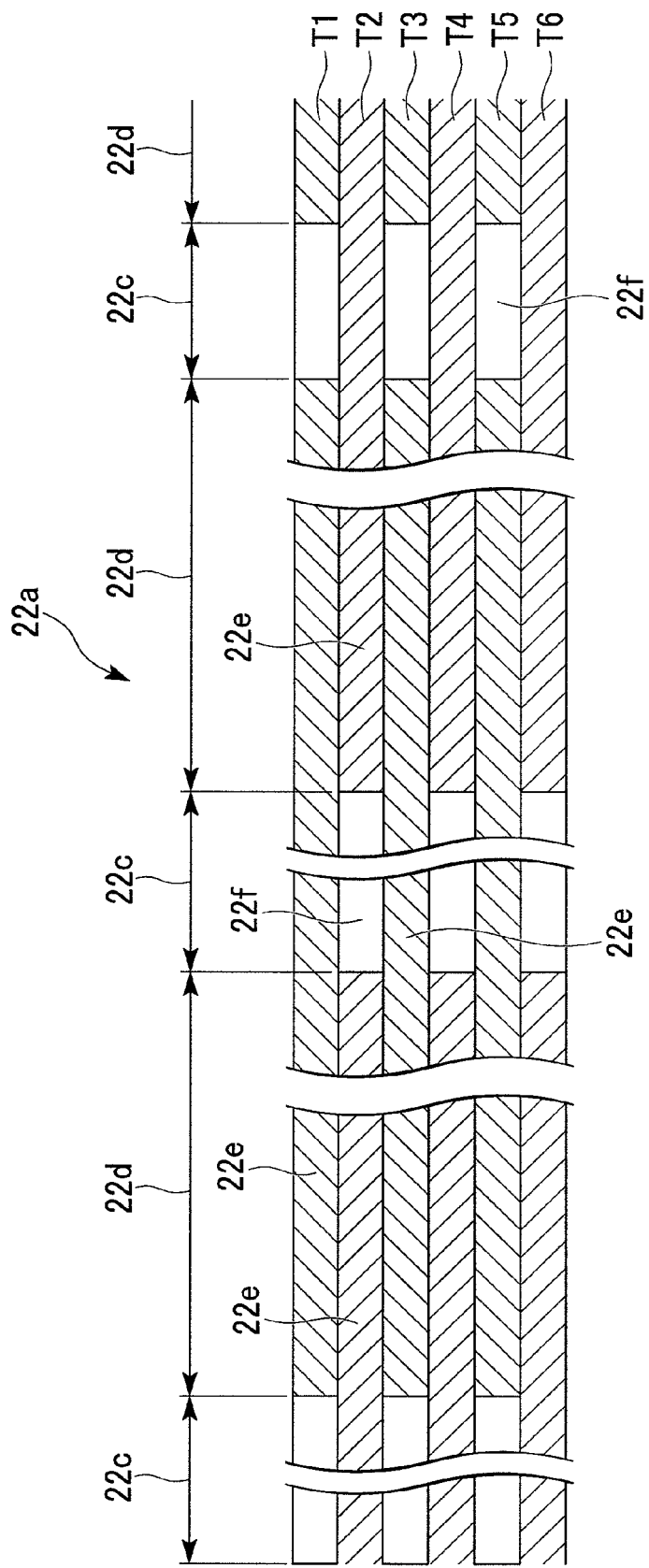
FIG. 5 is an enlarged plan view showing a portion of the front surface of an testing subject medium used in the present embodiment which has been enlarged.
Figure 6:
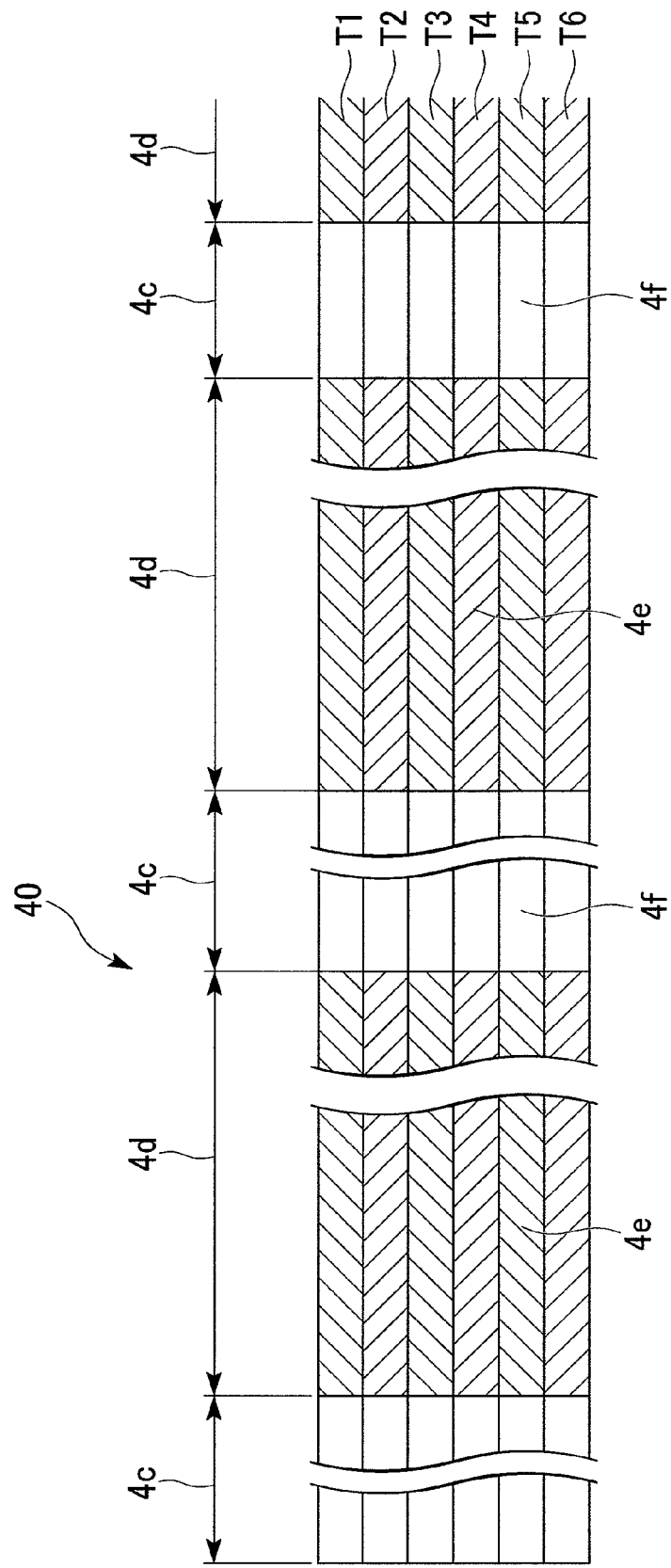
FIG. 6 is an enlarged plan view showing a portion of a disc shaped testing subject medium which has been enlarged.

FIG. 5 is an enlarged plan view showing a portion of the front surface of the testing subject medium 22a used in the present embodiment which has been enlarged. Note that in FIG. 5, the horizontal direction corresponds to the track extending direction in the testing subject medium 22a whereas the vertical direction corresponds to the radial direction of the testing subject medium 22a. In FIG. 5, the reference symbols T1, T2, T3, T4, T5, and T6 show tracks, 22c shows a servo corresponding region in the testing subject medium 22a that corresponds to the servo information region 21a of the master medium 21, and 22d shows a data corresponding region in the testing subject medium 22a that corresponds to the data information region 21b in the master medium 21.

As shown in FIG. 5, the testing subject medium 22a includes a plurality of inspected regions 22e which will be inspected in the present embodiment (regions shown with diagonal lines in FIG. 5) and a plurality of uninspected regions 22f which will not be inspected. Individual inspected region 22e corresponds to a range that is magnetically recorded/reproduced by the second magnetic head 25 through one single process which has been positioned in the positioning step, and is partitioned on a track to track basis in the track extending direction while being partitioned by uninspected regions 22f in the radial direction. Each of the inspected regions 22e shown in FIG. 5 corresponds to a region of the master medium 21 including 2 data information regions 21b adjacent to each other at the same track position via the servo information region 21a (refer to FIG. 4) and is a region including 2 data corresponding regions 22d that are adjacent to each other by sandwiching the servo corresponding region 22c therebetween at the same track position.

In addition, as shown in FIG. 5, the position of one of the inspected regions 22e in the radial direction is arranged at a different position from that of another of the adjacent inspected regions 22e arranged at a different track position. That is, the servo corresponding region 22c, in which the inspected regions 22e of the tracks T1, T3, and T5 shown in FIG. 5 are arranged, and the servo corresponding region 22c, in which the inspected regions 22e of the tracks T2 and T4 that are adjacent to the tracks T1, T3, and T5 are arranged, are different from one another in terms of the radial directions. As a result, in the present embodiment, the inspected regions 22e of the tracks T2 and T4 are arranged in the servo corresponding region 22c, in which the inspected regions 22e of the tracks T1, T3, and T5 are not arranged.

In addition, when the first magnetic head 35 is positioned based on the servo information signals obtained by making the first magnetic head 35 read the servo information from the master medium 21 in the positioning step, the second magnetic heads 25 that are fixed on the same axis as that of the first magnetic head 35 are also positioned at the same time, and the uninspected regions 22f correspond to the regions where the second magnetic heads 25 are floating during the positioning step. All the uninspected regions 22f are positioned, as shown in FIG. 5, in the servo corresponding region 22c that corresponds to the servo information region 21a of the master medium 21, and the uninspected regions 22f and the inspected regions 22e are arranged alternately on a track to track basis in the radial direction of the testing subject medium 22 within the servo corresponding region 22c. As a result, the width of the individual uninspected region 22f in the tack extending direction corresponds to the width of the servo corresponding region 22c, whereas the width of the individual uninspected region 22f in the radial direction corresponds to the track width. Accordingly, when circular defects are present within the uninspected regions 22f shown in FIG. 5, for example, diameter of the largest defect will become the same as the track width.

Note that in the present embodiment, as shown in FIG. 5, although the case where the inspected region 22e corresponds to a region including 2 data information regions 21b of the master medium 21 is described as an example, the inspected regions 22e may correspond to a region including 3 or more data information regions 21b of the master medium 21.

In the present invention, the wider the inspected regions 22e become (in other words, the longer the inspected regions 22e become in the track extending direction), the smaller the total area of uninspected regions 22f become on the testing subject medium 22. Thus, it is preferable that the inspected regions 22e be wide. However, when the inspected regions 22e become wider (in other words, when the inspected regions 22e become longer in the track extending direction), it is possible that a range which is magnetically recorded/ reproduced by the magnetic head through one single process will become longer and the positioning accuracy of the magnetic head with respect to the inspected regions 22e declines, which may lead to an unsatisfactory testing accuracy for magnetic recording media.

That is, the servo information region 21a provided in the master medium 21 used in the present invention can be provided not only at an actual position used in a hard disk drive but can also be provided where appropriate, depending on the positioning accuracy of the magnetic heads. For example, when a positioning mechanism for the magnetic heads which is used in an actual hard disk drive is used as an testing apparatus of the present invention, the length of an inspected region on the testing subject medium 22 is made 256 servo sectors for one round of each track, as in an actual hard disk drive, whereas the servo information region 21a provided in the master medium 21 is made 512 servo sectors for one round of each track, and this servo information is used at intervals of one piece of servo information. For example, even numbered tracks use the servo sectors at even numbered positions whereas odd numbered tracks use the servo sectors at odd numbered positions, thereby enabling a test. Here, the servo information can be used, for one round of each track of the master medium 21, not only at intervals of one piece of servo information but also at intervals of a plurality of pieces of servo information. For example, an testing method that adopts the following steps can be used: that is, a master medium is prepared where 1024 servo information is recorded for one round of each track, and the first servo sector information is used in an Nth track, and while not using the second, third, and fourth servo sector information, the fifth servo sector information is used, and this whole process is repeated. In addition, the second, sixth, and tenth servo information and the servo information thereafter which follow in the same manner are used in the N+1th track, whereas the third, seventh, and eleventh servo information and the servo information thereafter which follow in the same manner are used in the N+2th track, and so on and so forth.

In the present invention, it is preferable that the inspected regions 22e correspond to a region including 2 or 3 data information regions 21b, most preferably correspond to a region including 2 data information regions 21b for the sake of improving testing accuracy. In addition, the number of data information regions 21b of the master medium 21 included in a region that corresponds to the inspected regions 22e may be the same in all the inspected regions 22e or may be different. For example, it is also possible that the regions including 2 data information regions 21b and the regions including 3 data information regions 21b are present at the same time.

After positioning the second magnetic heads 25 in the positioning step, the magnetic recording/reproducing signals are generated by making the second magnetic heads 25, through the second head driving signals from the signal processing circuit 27, to magnetically record on/reproduce from the inspected regions 22e (signal generating step).

Thereafter, the servo information signals obtained from the first magnetic head 35 in the positioning step and the magnetic recording/reproducing signals from the second magnetic heads 25 that correspond to the servo information signals and are obtained in the signal generating step are transmitted to the signal processing circuit 27. The servo information signals and the magnetic recording/reproducing signals received by the signal processing circuit 27 are processed alternately by the signal processing circuit 27, synchronized by the signal processing circuit 27, and the magnetic recording/reproducing signals in the testing subject medium 22 will be inspected (signal processing step).

Due to such a test of magnetic recording/reproducing signals by the signal processing circuit 27, certification tests such as a bit error rate test, a parametric (electromagnetic conversion characteristics) test, and a defect test (an test for testing a magnetic recording medium for its usability due to defects or scratches) can be conducted on the testing subject medium 22.

Here, since the testing subject media 22a and 22b are a both sided type in which a magnetic layer is formed on both sides thereof, the testing process is carried out on both front and back surfaces of the testing subject media 22a and 22b. In the testing apparatus shown in FIG. 2, the second magnetic head 25a is arranged in the front surface side of the testing subject medium 22b whereas the second magnetic head 25b is arranged in the back surface side of the testing subject medium 22b. As a result, the testing subject medium 22b can be inspected continuously on both front and back surfaces without being inverted. Note that in the testing apparatus shown in FIG. 2, the second magnetic head 25c is arranged in the front surface side of the testing subject medium 22a whereas the second magnetic head 25d is arranged in the back surface side of the testing subject medium 22a. As a result, the testing subject medium 22b can also be inspected continuously on both front and back surfaces without being inverted.

In the present embodiment, there is no particular limitation on the order for testing two testing subject media 22a and 22b. The test on the two testing subject media 22a and 22b can be carried out, for example, in the following order. That is, the testing process conducted on one inspected region 22e in the front surface of the testing subject medium 22b, followed by the testing process conducted on one inspected region 22e in the back surface of the testing subject medium 22b, followed by the testing process conducted on one inspected region 22e in the front surface of the testing subject medium 22a, followed by the testing process conducted on one inspected region 22e in the back surface of the testing subject medium 22a, followed by the testing process conducted on another inspected region 22e in the front surface of the testing subject medium 22b, followed by the testing process conducted on another inspected region 22e in the back surface of the testing subject medium 22b, and so on and so forth.

By conducting an test on the two testing subject media 22a and 22b through such an order, moving distance of the first magnetic head 35 and the second magnetic heads 25 will be shortened and thereby making it possible to shorten the travel time of the first magnetic head 35 and the second magnetic heads 25, as compared to the case where, for example, all the inspected regions 22e in the front surface of the testing subject medium 22b are inspected, and then all the inspected regions 22e in the back surface of the testing subject medium 22b are inspected, followed by the test of the testing subject medium 22a in a similar manner to that adopted for testing the testing subject medium 22b.

Thereafter, the first magnetic head 35 and the second magnetic heads 25 are retracted to the save area 29, the testing subject media 22a and 22b are dismounted to be replaced by new testing subject media, and an testing process is then conducted in the same manner as described above.

In the method according to the present embodiment for testing a magnetic recording medium, a portion of a region corresponding to the servo information region 21a of the master medium 21 in the testing subject medium 22 will be included in the inspected region 22e for the following reasons. In the method, a positioning step in which the second magnetic heads 25 are positioned in the inspected region 22e of the testing subject medium 22 based on the servo information signals, a signal generating step in which a magnetic recording/reproducing signal is generated by making the second magnetic heads 25 to magnetically record on/reproduce from the inspected region 22e, and a signal processing step in which the magnetic recording/reproducing signal is inspected, are included. Moreover, in the method, the master medium 21 includes the servo information region 21a where the servo information is recorded radially from the center in a continuous manner, the inspected regions 22e correspond to regions in the master medium 21 including 2 or more data information regions 21b adjacent to each other in the same track position via the servo information region 21a, and the position of one of the inspected regions 22e in the radial direction is arranged at a different position from that of another of the adjacent inspected regions 22e arranged at a different track position.

As a result, in the method according to the present embodiment for testing a magnetic recording medium, defects having a diameter larger than the track width can be detected effectively without forming, on the testing subject medium 22, one wide uninspected region where a plurality of uninspected regions 22f are unified radially from the center, as compared to the case where all the regions corresponding to the servo information region 21a of the master medium 21 in the testing subject medium 22 are uninspected regions 22f.

In addition, in the method according to the present embodiment for testing a magnetic recording medium, since the inspected region 22e corresponds to the region including 2 data information regions 21b, large defects can be detected effectively and sufficiently high positioning accuracy for the magnetic heads with respect to the inspected regions 22e can be achieved.

Moreover, in the method according to the present embodiment for testing a magnetic recording medium, since the servo information signals from the first magnetic head 35 and the magnetic recording/reproducing signals from the second magnetic heads 25 which correspond to the servo information signals are processed alternately, it is possible to achieve commonality of a system for processing signals from the first magnetic head 35 and a system for processing signals from the second magnetic heads 25, thereby simplifying the testing apparatus used in the present invention.

Furthermore, in the method according to the present embodiment for testing a magnetic recording medium, controlled positioning of the second magnetic heads 25 on the testing subject medium 22 with respect to the inspected regions 22e is conducted based on the servo information of the master medium 21. As a result, a certification test with high accuracy under the conditions that are close to the actual method through which a magnetic recording medium is used in a hard disk drive can be conducted.

In addition, in the present embodiment, since the master medium 21 is mounted at the lowest position on a spindle and the testing subject medium 22 is mounted above the master medium 21, an testing process can be carried out continuously on numerous testing subject media by replacing only an testing subject medium while using the master medium 21 repeatedly, thereby considerably enhancing the throughput of a certification test.

Moreover, since the head stack assemblies used in a hard disk drive usually have only one preamplifier that processes signals from a plurality of heads, and thus one preamplifier processes signals from a plurality of heads by switching from one to another.

In the method according to the present embodiment for testing a magnetic recording medium, since the obtained servo information signals read by the first magnetic head 35 and the magnetic recording/reproducing signals obtained by making the second magnetic heads 25 to carry out a magnetic recording/reproducing process are synchronized, and since the signal processing circuit 27 for testing the magnetic recording/reproducing signals in the testing subject medium 22 is used, it will be possible to directly use a head stack assembly as it is which is used in a hard disk drive as the head stack assembly 31.

In addition, in the method according to the present embodiment for testing a magnetic recording medium, when a head stack assembly used in a hard disk drive is used directly as it is as the head stack assembly 31, various effects can be attained such as the achievement of a downsized testing apparatus, the achievement of low production cost, and the achievement of a certification test with high accuracy under the conditions that are close to the actual method through which a magnetic recording medium is used in a hard disk drive.

Note that although an example is used for description in the present embodiment where 2 testing subject media are used, the method of the present invention for testing a magnetic recording medium is not limited to the abovementioned example.

For example, any number of testing subject media which is not more than a half of the number of the second magnetic heads provided in the head stack assembly 31 can be used, and it may even be one testing subject medium.

In addition, although 4 second magnetic heads are used in the present embodiment, any number of second magnetic heads can be used as long as all the second magnetic heads as well as the first magnetic head which are mounted on the head stack assembly 31 can be stably rotated synchronously and coaxially.

Also, the method for producing a magnetic recording medium according to the present invention includes a step for carrying out an testing process using the abovementioned method for testing a magnetic recording medium. According to the method for producing a magnetic recording medium of the present invention, a magnetic recording medium which is excellent in terms of reliability can be produced, which has been inspected with a high level of accuracy.

EXAMPLES

Although the present invention will be specifically described below using working Examples, the present invention is not limited to these Examples.

A magnetic recording medium shown in FIG. 1 having an outer diameter of 2.5 inches was produced and a glide test and a certification test were carried out on the magnetic recording medium.

[Glide Test]

In the glide test, a mechanical spacing between an testing head and the surface of a magnetic recording medium was set to 0.25 microinches, and a magnetic recording medium was judged as a defective item when signals were output from the testing head which were caused by the collision with the projections and protrusions on the surface of the magnetic recording medium, and a magnetic recording medium was judged as a non-defective item in other cases.

[Certification Test]

A certification test was conducted as follows using one magnetic recording medium which was judged as a non-defective item in the glide test as an testing subject medium. The certification test was carried out using an testing apparatus shown in FIGS. 2 and 3.

Note that a TuMR head used in a hard disk drive of 2.5 inches and 60 Gigabytes (one disc) was used as the first magnetic head and the second magnetic heads. In addition, a general purpose head stack assembly employed in a hard disk drive was used as a head stack assembly.

Also, as a master medium, a medium was used in which a plurality of servo information regions were provided radially and in a continuous manner from the center, thereby forming data information regions, each of which was formed between two adjacent servo information regions. Note that as a master medium, in conformity with actual use of a magnetic recording medium in a hard disk drive, a medium was used in which servo track pitches were 0.1 μm, and servo information composed of 100,000 of track position information for one surface and 512 sector position information for one round of each track having a number of sectors which was about twice as many as the number of servo sectors used in the actual hard disk drive was recorded in a recording region corresponding to the servo information region. Moreover, in the position at a 20 mm radius from the master medium, the length of each servo information region in the track extending direction was about 60 μm and the length of each data information region in the track extending direction was about 430 μm.

In the certification test, the master medium was first mounted at the lowest end of the spindle and one testing subject medium was then mounted above the master medium. Subsequently, while rotating the master medium and the testing subject medium coaxially and synchronously at 3,600 rpm, the first magnetic head was made to read servo information from the master medium by synchronously moving the first magnetic head and the second magnetic heads with respect to the surfaces of the master medium and the testing subject medium, and the second magnetic heads were positioned in the inspected region on the surfaces of the testing subject medium based on the obtained servo information signals (positioning step).

Then, magnetic recording/reproducing signals were generated by making the second magnetic heads conduct magnetic recording/reproducing of the inspected regions (signal generating step). Subsequently, the magnetic recording/reproducing signals obtained in this manner were inspected (signal processing step).

Note that the inspected regions of the testing subject medium where the second magnetic heads were positioned in the positioning step corresponded to regions in the master medium including 2 or more data information regions adjacent to each other in the same track position via the servo information region. In addition, the position of one of the inspected regions in the radial direction was made different from the position of another of the adjacent inspected regions arranged at a different track position.

Specifically, in the outermost track of the testing subject medium, magnetic recording/reproducing signals were generated from the data corresponding region (a region corresponding to the data information region in the master medium) at even numbered sector positions (that is, second, fourth, sixth, eighth, and tenth, positions and so on and so forth) with a certain sector position as a starting point, up to the distance equivalent to 2 data corresponding regions and one servo corresponding region (a region corresponding to the servo information region in the master medium) in the track extending direction; in the inner track adjacent to the outermost track, magnetic recording/reproducing signals were generated from the data corresponding region at odd numbered sector positions (that is, first, third, fifth, seventh, and ninth positions, and so on and so forth) with the sector position adjacent to the sector position, which was adopted as the starting point in the outermost track, as a starting point, up to the distance equivalent to 2 data corresponding regions and one servo corresponding region in the track extending direction; in the inner track adjacent to the second outer track, magnetic recording/reproducing signals were generated from the data corresponding region at even numbered sector positions with the sector position adjacent to the sector position, which was adopted as the starting point in the second outer track, as a starting point, up to the distance equivalent to 2 data corresponding regions and one servo corresponding region in the track extending direction; and magnetic recording/reproducing signals were further generated in the same manner in the following tracks.

In addition, the test of magnetic recording/reproducing signals was conducted continuously from the outside tracks to the inside tracks in the testing subject medium.

By conducting an test of magnetic recording/reproducing signals in a manner described above, electromagnetic conversion characteristic test and bit error rate test of the pertinent recording regions (track and sector positions) in the front surface of the testing subject medium were carried out in this order.

Then, in the same manner as the abovementioned test conducted on the front surface of the testing subject medium, electromagnetic conversion characteristic test and bit error rate test of the pertinent recording regions in the back surface of the testing subject medium were carried out in this order. Subsequently, in the same manner as the abovementioned test conducted on the front surface of the testing subject medium, defect test of the recording regions over the entire surface of both front and back surfaces of the testing subject medium was conducted.

By carrying out such an test on the magnetic recording medium, it was possible to achieve a certification test with a high level of accuracy under the conditions that are close to the actual method through which a magnetic recording medium is used in a hard disk drive.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for testing a magnetic recording medium, the method comprising:
    a positioning step in which, while synchronously and coaxially rotating a disc shaped master medium where servo information is recorded and a disc shaped testing subject medium, a first magnetic head that reads the servo information from the master medium and a second magnetic head that carries out a magnetic recording/reproducing process of the testing subject medium are first moved synchronously with respect to the surfaces of the master medium and the testing subject medium, and then the second magnetic head is positioned in an inspected region of the testing subject medium based on servo information signals obtained by making the first magnetic head to read the servo information from the master medium;
    a signal generating step in which a magnetic recording/reproducing signal is generated by making the second magnetic head to conduct a magnetic recording/reproducing process of the inspected region; and
    a signal processing step in which the magnetic recording/reproducing signal obtained in the signal generating step is inspected,
    wherein the master medium includes a servo information region where the servo information is recorded radially from the center in a continuous manner,
    the inspected region corresponds to regions in the master medium including 2 or more data information regions adjacent to each other in the same track position via the servo information region, and
    a position of one of the inspected regions in the radial direction is arranged at a different position from that of another of the adjacent inspected regions arranged at a different track position.

2. The method for testing a magnetic recording medium according to claim 1, wherein the inspected region corresponds to a region that includes 2 data information regions.

3. The method for testing a magnetic recording medium according to claim 2,
    wherein servo information signal from the first magnetic head and the magnetic recording/reproducing signal from the second magnetic head that corresponds to this servo information signal are processed alternately.

4. The method for testing a magnetic recording medium according to claim 2,
    wherein the testing subject medium is a plurality of media;
    in the positioning step, while the master medium and the plurality of the testing subject media are synchronously and coaxially rotated, by synchronously and coaxially rotating a first support arm at an end of which the first magnetic head is installed and a plurality of second support arms at an end of which the second magnetic head is installed, the first magnetic head and a plurality of second magnetic heads, each of which are installed in the plurality of second support arms, are moved synchronously; and
    in the signal generating step, the plurality of second magnetic heads are made to carry out a magnetic recording/reproducing process in each of the inspected regions of the plurality of inspected subject media, thereby generating each magnetic recording/reproducing signal.

5. A method for producing a magnetic recording medium comprising:
    a test step in which a testing process is carried out using the method for testing a magnetic recording medium of claim 2.

6. The method for testing a magnetic recording medium according to claim 1,
    wherein servo information signal from the first magnetic head and the magnetic recording/reproducing signal from the second magnetic head that corresponds to this servo information signal are processed alternately.

7. The method for testing a magnetic recording medium according to claim 6,
    wherein the testing subject medium is a plurality of media;
    in the positioning step, while the master medium and the plurality of the testing subject media are synchronously and coaxially rotated, by synchronously and coaxially rotating a first support arm at an end of which the first magnetic head is installed and a plurality of second support arms at an end of which the second magnetic head is installed, the first magnetic head and a plurality of second magnetic heads, each of which are installed in the plurality of second support arms, are moved synchronously; and
    in the signal generating step, the plurality of second magnetic heads are made to carry out a magnetic recording/ reproducing process in each of the inspected regions of the plurality of inspected subject media, thereby generating each magnetic recording/reproducing signal.

8. A method for producing a magnetic recording medium comprising:
   a test step in which a testing process is carried out using the method for testing a magnetic recording medium of claim 6.

9. The method for testing a magnetic recording medium according to claim 1,
   wherein the testing subject medium is a plurality of media;
   in the positioning step, while the master medium and the plurality of the testing subject media are synchronously and coaxially rotated, by synchronously and coaxially rotating a first support arm at an end of which the first magnetic head is installed and a plurality of second support arms at an end of which the second magnetic head is installed, the first magnetic head and a plurality of second magnetic heads, each of which are installed in the plurality of second support arms, are moved synchronously; and
   in the signal generating step, the plurality of second magnetic heads are made to carry out a magnetic recording/reproducing process in each of the inspected regions of the plurality of inspected subject media, thereby generating each magnetic recording/reproducing signal.

10. A method for producing a magnetic recording medium comprising:
    a test step in which a testing process is carried out using the method for testing a magnetic recording medium of claim 9.

11. A method for producing a magnetic recording medium comprising:
    a test step in which a testing process is carried out using the method for testing a magnetic recording medium of claim 1.

* * * * *